(12) United States Patent
Murakami et al.

(10) Patent No.: US 10,409,256 B2
(45) Date of Patent: Sep. 10, 2019

(54) TOOL-PATH GENERATING DEVICE, TOOL-PATH GENERATING METHOD, AND NON-TRANSITORY RECORDING MEDIUM STORING TOOL-PATH GENERATING PROGRAM

(71) Applicant: FANUC CORPORATION, Yamanashi (JP)

(72) Inventors: Hiroki Murakami, Yamanashi (JP); Souichirou Ide, Yamanashi (JP); Osamu Hanaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 67 days.

(21) Appl. No.: 15/788,916

(22) Filed: Oct. 20, 2017

(65) Prior Publication Data
US 2018/0120808 A1   May 3, 2018

(30) Foreign Application Priority Data
Oct. 28, 2016   (JP) ................. 2016-211702

(51) Int. Cl.
*G05B 19/4103* (2006.01)
*G05B 19/402* (2006.01)

(52) U.S. Cl.
CPC ....... *G05B 19/402* (2013.01); *G05B 19/4103* (2013.01); *G05B 2219/34042* (2013.01);
(Continued)

(58) Field of Classification Search
None
See application file for complete search history.

(56) References Cited

U.S. PATENT DOCUMENTS 5,027,045 A * 6/1991 Iwagaya ............. G05B 19/184
318/567
5,140,236 A * 8/1992 Kawamura ........ G05B 19/4103
318/568.1
(Continued)

FOREIGN PATENT DOCUMENTS

CN       101470434 A    7/2009
CN       103180792 A    6/2013
(Continued)

OTHER PUBLICATIONS

Japanese Decision to Grant a Patent dated Jul. 17, 2018, in connection with corresponding JP Application No. 2016-211702 (6 pgs., including English translation).
(Continued)

*Primary Examiner* — Thomas C Lee
*Assistant Examiner* — Gary Collins
(74) *Attorney, Agent, or Firm* — Maier & Maier, PLLC

(57) ABSTRACT

Provided is a tool-path generating device that includes a point-sequence generating unit that generates a point sequence that represents a tool path on the basis of a machining program, and a smoothing unit that smooths the generated point sequence. The smoothing unit includes a filter-length setting unit that sets filter lengths that are applied to the points such that a pre/post-smoothing divergence amount of each point in the point sequence is equal to or less than a first threshold, a filter-length changing unit that changes the set filter lengths such that an absolute value of a difference between the filter lengths applied to adjacent points in the point sequence is equal to or less than a second threshold, and a filter processing unit that performs filter processing on the basis of the changed filter lengths.

5 Claims, 4 Drawing Sheets

(52) U.S. Cl.
CPC .............. *G05B 2219/39573* (2013.01); *G05B 2219/41152* (2013.01)

(56) References Cited

U.S. PATENT DOCUMENTS

| | | | | |
|---|---|---|---|---|
| 5,351,205 A * | 9/1994 | Hoos | ................. | G05B 19/416 318/568.18 |
| 5,434,489 A * | 7/1995 | Cheng | ................. | B25J 9/1656 318/568.15 |
| 5,503,160 A * | 4/1996 | Pering | ................. | A61B 5/0428 600/508 |
| 5,723,961 A * | 3/1998 | Fujino | ................. | G05B 19/4103 318/568.15 |
| 5,726,896 A * | 3/1998 | Jia | ................. | G06T 11/203 318/568.13 |
| 5,815,401 A * | 9/1998 | Otsuki | ................. | G05B 19/4103 700/189 |
| 5,909,384 A * | 6/1999 | Tal | ................. | G06F 17/10 370/290 |
| 6,012,031 A * | 1/2000 | Oliver | ................. | H03H 17/026 704/500 |
| 6,266,570 B1 * | 7/2001 | Hocherl | ................. | G05B 19/19 700/54 |
| 6,401,006 B1 * | 6/2002 | Mizuno | ................. | G05B 19/4103 318/568.15 |
| 6,539,275 B1 * | 3/2003 | Mizuno | ................. | G05B 19/416 700/159 |
| 7,444,202 B2 * | 10/2008 | Fauser | ................. | G05B 19/4103 700/159 |
| 2003/0125830 A1 * | 7/2003 | Munz | ................. | G05B 19/4103 700/189 |
| 2004/0122549 A1 * | 6/2004 | Otsuki | ................. | G05B 19/4103 700/189 |
| 2005/0190185 A1 * | 9/2005 | Fauser | ................. | G05B 19/4103 345/441 |
| 2006/0247820 A1 * | 11/2006 | Otsuki | ................. | G05B 19/4103 700/189 |
| 2007/0278980 A1 * | 12/2007 | Wilson | ................. | G05B 19/25 318/573 |
| 2009/0248203 A1 | 10/2009 | Nakamura et al. | | |
| 2013/0211578 A1 | 8/2013 | Tanuma et al. | | |
| 2013/0218323 A1 * | 8/2013 | Otsuki | ................. | G05B 19/19 700/187 |
| 2014/0025194 A1 | 1/2014 | Koide | | |
| 2014/0195037 A1 * | 7/2014 | Nishibashi | ......... | G05B 19/4103 700/188 |
| 2015/0205283 A1 * | 7/2015 | Brand | ................. | G05B 19/4103 700/186 |

FOREIGN PATENT DOCUMENTS

| | | |
|---|---|---|
| CN | 103257614 A | 8/2013 |
| EP | 1389749 A2 | 2/2004 |
| JP | H09-265310 A | 10/1997 |
| JP | 2000-003212 A | 1/2000 |
| JP | 3466111 B | 11/2003 |
| JP | 2004-078516 A | 3/2004 |
| JP | 2011-096077 A | 5/2011 |
| JP | 2013-171376 A | 9/2013 |
| JP | 2014-021759 A | 2/2014 |
| TW | I524162 B | 3/2016 |

OTHER PUBLICATIONS

Japanese Office Action dated Mar. 13, 2018, in connection with corresponding JP Application No. 2016-211702 (6 pgs., including English translation).

* cited by examiner

TOOL-PATH GENERATING DEVICE, TOOL-PATH GENERATING METHOD, AND NON-TRANSITORY RECORDING MEDIUM STORING TOOL-PATH GENERATING PROGRAM

CROSS-REFERENCE TO RELATED APPLICATIONS

This application is based on Japanese Patent Application No. 2016-211702, the content of which is incorporated herein by reference.

TECHNICAL FIELD

The present invention relates to a tool-path generating device, a tool-path generating method, and a tool-path generating program that are suitable for generating a tool path to be utilized in a numerical control device.

BACKGROUND ART

In the related art, techniques are known for generating a smooth tool path by subjecting a tool path specified by instructed points to smoothing processing in a numerical control device of a machine tool. Methods based on Bezier curves, B-spline curves, NURBS curves, simple averages, and weighted averages are used as smoothing methods, for example.

However, level differences may be generated between adjacent tool paths, and machining quality may be adversely affected when smoothing processing is performed on a tool path in which there are spaces between peak feed sections in the case where curve machining such as reciprocal machining and contour machining is performed. This is caused by a characteristic of smoothing processing in that the path of an approximation curve greatly changes with small differences in line section distance between block end points of adjacent tool paths and with small differences in the shape of a tool path, such as a bent state.

PTL 1 discloses a device that sets a plurality of target points at regular intervals along a tool path read out from a machining program, and generates a new tool path by performing smoothing processing on the basis of the plurality of target points.

CITATION LIST

Patent Literature

{PTL 1}
Japanese Unexamined Patent Application Publication No. 2011-96077

SUMMARY OF INVENTION

A first aspect of the present invention is directed to a tool-path generating device that includes a point-sequence generating unit that generates a point sequence that represents a tool path on the basis of a machining program, and a smoothing unit that smooths the generated point sequence. The smoothing unit includes a filter-length setting unit that sets filter lengths that are applied to the points such that a pre/post-smoothing divergence amount of each point in the point sequence is equal to or less than a first threshold, a filter-length changing unit that changes the set filter lengths such that an absolute value of a difference between the filter lengths applied to adjacent points in the point sequence is equal to or less than a second threshold, and a filter processing unit that performs filter processing on the basis of the changed filter lengths.

A second aspect of the present invention is directed to a tool-path generating method that includes a point-sequence generating step of generating a point sequence that represents a tool path on the basis of a machining program, and a smoothing step of smoothing the generated point sequence. The smoothing step includes a step of setting filter lengths that are applied to the points such that a pre/post-smoothing divergence amount of each point in the point sequence is equal to or less than a first threshold, a step of changing the set filter lengths such that an absolute value of a difference between the filter lengths applied to adjacent points in the point sequence is equal to or less than a second threshold, and a step of performing filter processing on the basis of the changed filter lengths.

A third aspect of the present invention is directed to a non-transitory recording medium storing a tool-path generating program that causes a computer to execute point-sequence generating processing that generates a point sequence that represents a tool path on the basis of a machining program, and smoothing processing that smooths the generated point sequence. The smoothing processing includes processing for setting filter lengths that are applied to the points such that a pre/post-smoothing divergence amount of each point in the point sequence is equal to or less than a first threshold, processing for changing the set filter lengths such that an absolute value of a difference between the filter lengths applied to adjacent points in the point sequence is equal to or less than a second threshold, and processing for performing filter processing on the basis of the changed filter lengths.

DESCRIPTION OF EMBODIMENTS

Figure 1:
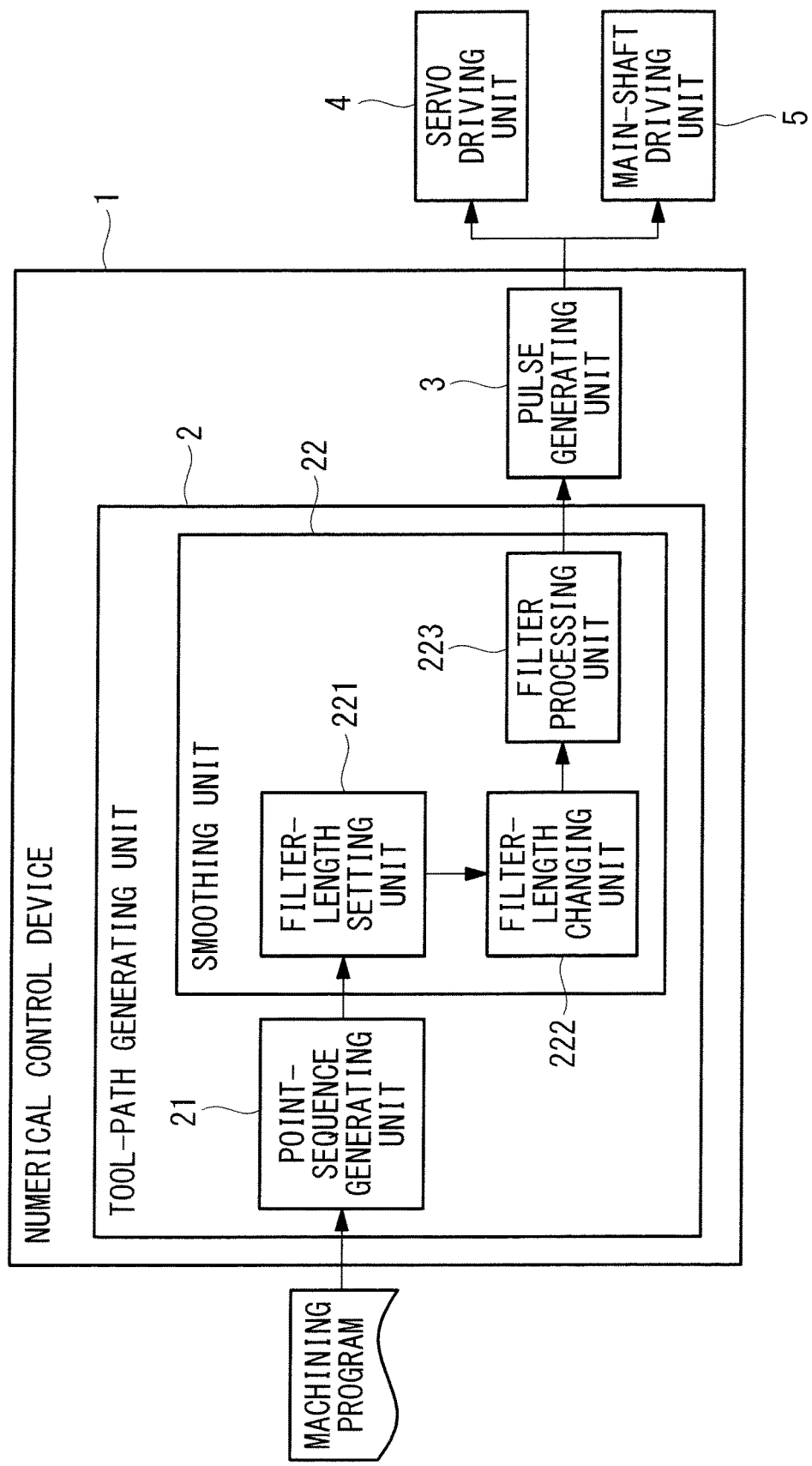
FIG. 1 is a block diagram illustrating, in outline, a configuration of a numerical control device according to an embodiment of the present invention.

Hereafter, a numerical control device according to an embodiment of the present invention will be described while referring to the drawings.

As illustrated in FIG. 1, a numerical control device 1 is configured to control, on the basis of a machining program input thereto, a servo driving unit 4 that drives a servo motor, and a main-shaft driving unit 5 that drives a main shaft motor, the servo motor and the main shaft motor being parts of a machine tool or the like.

Although not illustrated, the numerical control device 1 includes a central processing unit (CPU), a main storage device such as a random access memory (RAM), an auxiliary storage device such as a hard disk drive (HDD), an input device such as a keyboard, an output device such as a monitor, an external interface that exchanges various data with external devices, and a control mechanism that receives shaft movement instructions from the CPU and controls the servo driving unit 4 and the main-shaft driving unit 5 of the machine tool. A program and so forth are stored in the auxiliary storage device, and the CPU reads out the program from the auxiliary storage device and executes the program, whereby the various functions described in this embodiment are implemented.

As illustrated in FIG. 1, the numerical control device 1 includes, as functional blocks, a tool-path generating unit (tool-path generating device) 2, and a pulse generating unit 3 that generates pulses for controlling the servo driving unit 4 and the main-shaft driving unit 5.

The tool-path generating unit 2 includes a point-sequence generating unit 21 that generates a point sequence on the basis of a machining program input thereto, and a smoothing unit 22 that performs smoothing processing on the generated point sequence.

Figure 2:
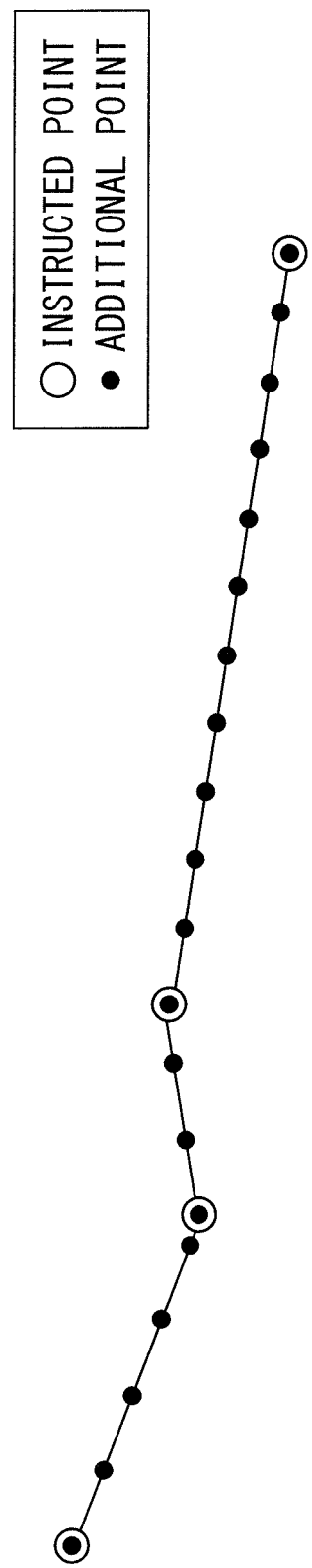
FIG. 2 illustrates an example of a point sequence that is constituted by instructed points that are included in a machining program, and additional points that are added in a point-sequence generating unit.

The point-sequence generating unit 21 is configured to generate a point sequence that will serve as a tool path by extracting a plurality of instructed points included in the machining program. In this case, as illustrated in FIG. 2, additional points obtained by interpolating the individual instructed points may be added, and thus a point sequence that has a greater number of points and that is composed of the plurality of instructed points and the additional points may be generated. The additional points may be added in any manner between the individual instructed points, and for example, an additional point is added for every distance advanced within a prescribed time interval in accordance with a command speed specified within the machining program.

The smoothing unit 22 is configured to perform smoothing processing using a filter. In this embodiment, a simple average is used as a filter. Smoothing processing using a filter is preferable because large variations are not generated between smoothing processing results due to small differences in the shape of a tool path, such as a bent state, compared with smoothing processing using spline curves and so on. This is because smoothing processing using a filter has the property that the value always changes such that the path curves inward with respect to the path before the smoothing processing.

A coordinate value $Q_n$ of an nth point in a point sequence Q obtained after smoothing processing using a simple average and composed of N points can be expressed by formula (1), where $P_n$ is the coordinate value of an nth point in a point sequence P before smoothing processing, generated by the point-sequence generating unit 21, and is composed of N points.

$$Q_n = \frac{\sum_{m=-L}^{L} P_{n+m}}{2L+1} \tag{1}$$

Figure 3:
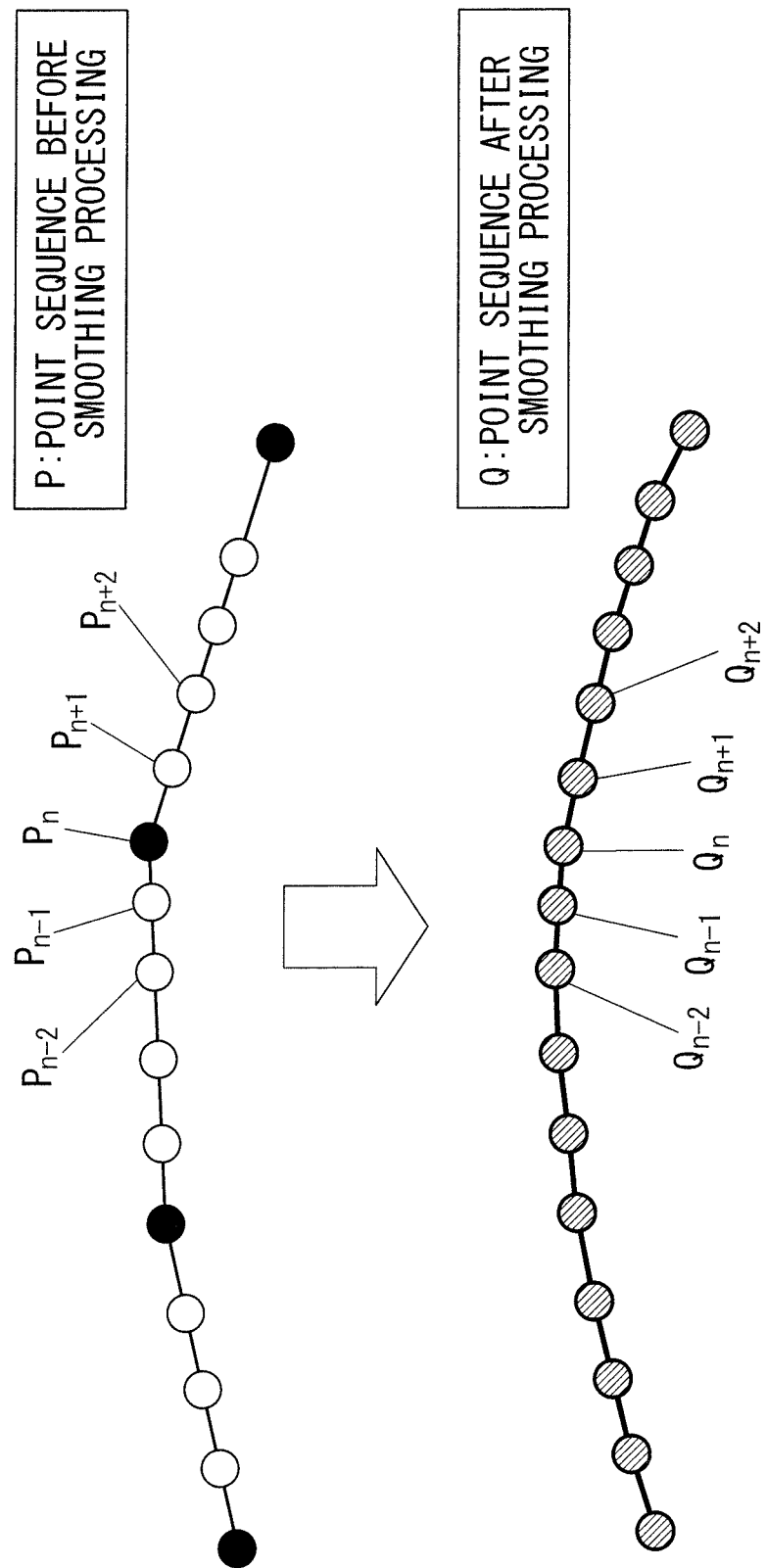
FIG. 3 illustrates an example of a point sequence before smoothing processing and a point sequence after smoothing processing.

In this case, L<n≤N−L, where L represents the range over which smoothing is performed, that is, the filter length. FIG. 3 illustrates an example for the case where L=2.

More specifically, as illustrated in FIG. 1, the smoothing unit 22 includes a filter-length setting unit 221, a filter-length changing unit 222, and a filter processing unit 223.

The filter-length setting unit 221 is configured to set a filter length L for every point in the point sequence P generated by the point-sequence generating unit 21.

In this case, the coordinate value $Q_n$ of the nth point in the point sequence Q obtained after smoothing processing has been performed using a filter length $L_n$ is expressed by $Q_n(L_n)$. A pre/post-smoothing processing divergence amount represented by formula (2) tends to become larger as the filter length $L_n$ becomes larger, and tends to become smaller as the filter length $L_n$ becomes smaller.

$$|P_n - Q_n(L_n)| \tag{2}$$

In the case where the filter length $L_n$=0, $$P_n = Q_n(0) \tag{3}$$

The filter-length setting unit 221 is configured to provide a tolerance (first threshold) for the pre/post-smoothing processing divergence amount, and sets the largest filter lengths $L_n$ that satisfy formula (4) for the individual points in the point sequence P.

$$|P_n - Q_n(L_n)| \leq \text{tolerance} \tag{4}$$

In this case, tolerance, which is written as "tolerance", has a value of zero or higher, and can be arbitrarily set.

In the case where formula (4) is not satisfied, an $L_n$ that satisfies formula (4) can be obtained by making $L_n$ smaller. From formula (3) and the fact that the tolerance has a value of zero or higher, it is guaranteed that there are always values of $L_n$ that satisfy formula (4).

The filter-length changing unit 222 is configured to change the filter length L set for each point in the point sequence P such that the absolute value of the difference between the filter lengths L set for adjacent points is equal to or less than a prescribed threshold (second threshold). More specifically, the filter-length changing unit 222 is configured to change the filter length $L_n$ such that the (n−1)-th filter length $L_{n-1}$ and the nth filter length $L_n$ satisfy formula (5), for example.

$$|L_{n-1} - L_n| \leq 1 \tag{5}$$

Here, 1<n≤N.

The filter-length changing unit 222 is configured to satisfy formula (5) by making the larger value among the filter lengths $L_n$ and $L_{n-1}$ smaller in the case where the filter length $L_n$ does not satisfy formula (5).

The filter processing unit 223 is configured to calculate coordinate values $Q_1(L_1)$ to $Q_N(L_N)$ by performing smoothing processing using a simple average filter on the basis of the filter lengths $L_1$ to $L_N$ changed by the filter-length changing unit 222.

The pulse generating unit 3 is configured to generate pulses from the coordinate values $Q_1(L_1)$ to $Q_N(L_N)$ calculated by the filter processing unit 223 in order to control the servo driving unit 4 and the main-shaft driving unit 5.

Next, a numerical control method that includes a tool-path generating method of this embodiment executed by the tool-path generating unit 2 having the above-described configuration will be described while referring to FIGS. 1 and 4.

Figure 4:
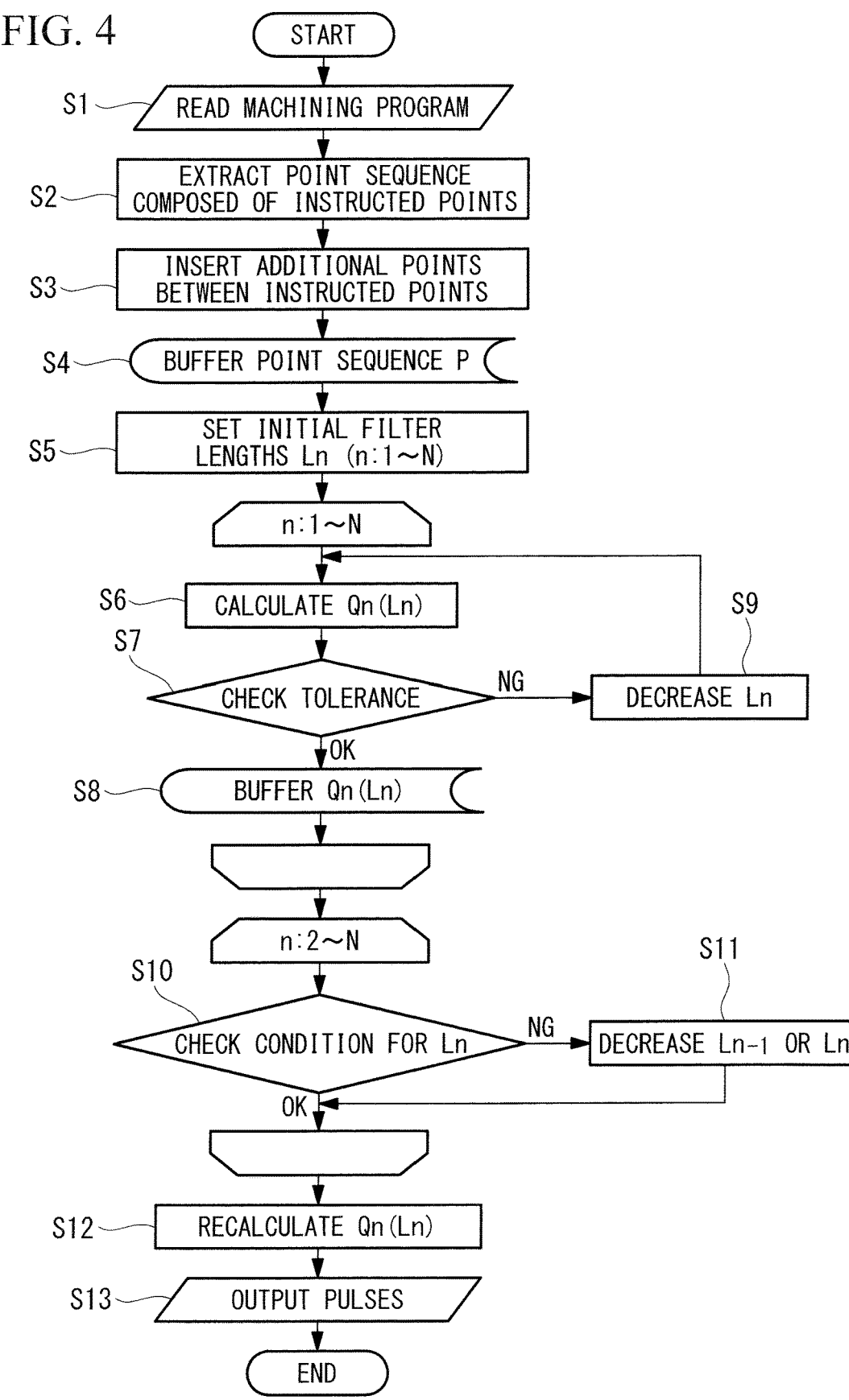
FIG. 4 is a flowchart illustrating processing that is executed by the numerical control device illustrated in FIG. 1.

First, a machining program is read into the point-sequence generating unit 21 (step S1 in FIG. 4), and a point sequence composed of instructed points is extracted from the machining program by the point-sequence generating unit 21 (step S2 in FIG. 4). Additional points are inserted by the point-sequence generating unit 21 as needed by interpolating the instructed points (step S3 in FIG. 4). Consequently, variations in the results of smoothing processing that arise from small differences in line segment distance between adjacent block end points in a tool path composed of instructed points included in a machining program can be reduced.

Buffering of a point sequence P newly generated in step S3 and composed of N points is performed (step S4 in FIG. 4).

Next, initial filter lengths $L_n$ are set for the N points by the filter-length setting unit 221 (step S5 in FIG. 4). The initial filter lengths are restricted by the buffering size of the point sequence P, but are set to be as large as possible.

Next, the processing of step S6 to step S9 is performed for the first to Nth points in the point sequence P. First, coordinate values $Q_n(L_n)$ are calculated for the points obtained after smoothing processing (step S6 in FIG. 4), and tolerance checking is performed (step S7 in FIG. 4). In the case where formula (4) is not satisfied, step S6 and step S7 are repeated while reducing the initial filter length $L_n$ set for the point (step S9 in FIG. 4). In the case where formula (4) is satisfied in the tolerance checking, coordinate values $Q_n(L_n)$ of the points obtained after the smoothing processing at this time are buffered (step S8 in FIG. 4).

Next, a condition check is performed by the filter-length changing unit 222 for each of the points in the point sequence P as to whether the filter lengths $L_n$ set for adjacent points satisfy formula (5) (step S10 in FIG. 4). In the case where filter lengths set for adjacent points do not satisfy formula (5), the larger value among the filter lengths $L_{n-1}$ and $L_n$ is reduced such that formula (5) is satisfied (step S11 in FIG. 4).

As a result of the method being configured in this way, the filter lengths can be changed such that a difference between filter lengths set for adjacent points does not change by an amount that is larger than a prescribed threshold while ensuring that a pre/post-smoothing processing divergence amount is equal to or less than the first threshold, and therefore, a smoother result of smoothing processing can be obtained.

The post-smoothing processing values $Q_n(L_n)$ are recalculated by performing filter processing based on a simple average using the filter processing unit 223 on the basis of the filter lengths $L_n$ for the individual points in the thus-obtained point sequence P (step S12 in FIG. 4).

$Q_n(L_n)-Q_{n-1}(L_{n-1})$, which is a movement instruction, is output as pulses by the pulse generating unit 3 of the numerical control device 1 in order to control the servo driving unit 4 and the main-shaft driving unit 5 (step S13 in FIG. 4).

Thus, the filter lengths of the filters to be applied to the points in the point sequence P are individually determined, and filter processing is performed on the basis of the determined filter lengths. Therefore, smoother smoothing processing can be performed, and it can be ensured that level differences are not generated between adjacent paths.

Embodiments of the present invention have been described in detail above while referring to the drawings, but a specific configuration of the present invention is not limited to these embodiments, and design changes and so forth that do not depart from the gist of the present invention are included in the scope of the present invention.

For example, in the above-described embodiments, integers have been used as the values of the filter lengths L, but real numbers may instead be used as the values of the filter lengths L. In this case, the coordinate value $Q_n$ of an nth point in the point sequence Q can be calculated using formula (6).

$$Q_n = \frac{(L-M)P_{n-M-1} + \left(\sum_{m=-M}^{M} P_{n+m}\right) + (L-M)P_{n+M+1}}{2L+1} \quad (6)$$

Here, M is the largest integer that does not exceed L.

In addition, although a simple average filter is used as the filter applied by the smoothing unit 22, the present invention is not limited to this configuration, and a filter such as a weighted average filter may be used instead, for example.

Furthermore, although the various functions of the tool-path generating unit 2 are implemented by executing a tool-path generating program using a processor in the above-described embodiments, the present invention is not limited to this configuration, and the various functions may instead be implemented in the form of hardware, such as a circuit on a silicon chip.

As a result, the above-described embodiment leads to the following aspects.

A first aspect of the present invention is directed to a tool-path generating device that includes a point-sequence generating unit that generates a point sequence that represents a tool path on the basis of a machining program, and a smoothing unit that smooths the generated point sequence. The smoothing unit includes a filter-length setting unit that sets filter lengths that are applied to the points such that a pre/post-smoothing divergence amount of each point in the point sequence is equal to or less than a first threshold, a filter-length changing unit that changes the set filter lengths such that an absolute value of a difference between the filter lengths applied to adjacent points in the point sequence is equal to or less than a second threshold, and a filter processing unit that performs filter processing on the basis of the changed filter lengths.

According to the tool-path generating device of the first aspect of the present invention, a point sequence that represents a tool path is generated on the basis of a machining program by the point-sequence generating unit. Next, filter lengths that are to be applied to the points are set by the filter-length setting unit of the smoothing unit such that a pre/post-smoothing divergence amount of each point in the point sequence is equal to or less than a first threshold. After that, the set filter lengths are changed by the filter-length changing unit of the smoothing unit such that an absolute value of a difference between the filter lengths applied to adjacent points in the point sequence is equal to or less than a second threshold. Finally, filter processing is performed by the filter processing unit of the smoothing unit on the basis of the changed filter lengths.

According to this aspect of the present invention, a smoother result can be obtained from smoothing processing, and it can be ensured that level differences are not generated between adjacent tool paths.

In the tool-path generating device of the first aspect of the present invention, the filter-length changing unit may be configured to change one filter among the filters applied to adjacent points such that the length of the one filter becomes smaller.

With this configuration, the filter lengths can be changed while ensuring that pre/post-smoothing processing divergence amounts are equal to or less than the first threshold, and therefore, a smoother result can be obtained from the smoothing processing.

In the tool-path generating device of the first aspect of the present invention, the point sequence generated by the point-sequence generating unit may be composed of a point sequence included in the machining program and additional points obtained by interpolating the points in the point sequence.

With this configuration, variations in the results of smoothing processing arising from small differences in line segment distance between adjacent block end points in a tool path composed of a point sequence included in a machining program can be reduced.

A second aspect of the present invention is directed to a tool-path generating method that includes a point-sequence generating step of generating a point sequence that represents a tool path on the basis of a machining program, and a smoothing step of smoothing the generated point sequence. The smoothing step includes a step of setting filter lengths that are applied to the points such that a pre/post-smoothing divergence amount of each point in the point sequence is equal to or less than a first threshold, a step of changing the set filter lengths such that an absolute value of a difference between the filter lengths applied to adjacent points in the point sequence is equal to or less than a second threshold, and a step of performing filter processing on the basis of the changed filter lengths.

A third aspect of the present invention is directed to a tool-path generating program that causes a computer to execute point-sequence generating processing that generates a point sequence that represents a tool path on the basis of a machining program, and smoothing processing that smooths the generated point sequence. The smoothing processing includes processing for setting filter lengths that are applied to the points such that a pre/post-smoothing divergence amount of each point in the point sequence is equal to or less than a first threshold, processing for changing the set filter lengths such that an absolute value of a difference between the filter lengths applied to adjacent points in the point sequence is equal to or less than a second threshold, and processing for performing filter processing on the basis of the changed filter lengths.

The aspects of the present invention afford the advantage that the quality of an article to be machined can be improved by ensuring that level differences are not generated between adjacent tool paths.

REFERENCE SIGNS LIST 2 tool-path generating unit (tool-path generating device)
21 point-sequence generating unit
22 smoothing unit
221 filter-length setting unit
222 filter-length changing unit
223 filter processing unit

The invention claimed is:

1. A tool-path generating device comprising:
at least one processor that generates a point sequence that represents a tool path based on a machining program; and
the at least one processor smooths the generated point sequence;
wherein the smoothing unit includes
the at least one processor sets filter lengths that are applied to the points such that a pre/post-smoothing divergence amount of each point in the point sequence is equal to or less than a first threshold, and that the filter lengths are set the largest,
the at least one processor changes the set filter lengths such that an absolute value of a difference between the filter lengths applied to adjacent points in the point sequence is equal to or less than a second threshold, and
the at least one processor performs filter processing based on the changed filter lengths.

2. The tool-path generating device according to claim 1, wherein the at least one processor that changes one filter length among the filter lengths applied to adjacent points such that the length of the one filter becomes smaller.

3. The tool-path generating device according to claim 1, wherein the point sequence generated by the at least one processor that comprises a point sequence included in the machining program and additional points obtained by interpolating the points in the point sequence.

4. A tool-path generating method comprising:
a point-sequence-generating step of generating a point sequence that represents a tool path based on a machining program; and
a smoothing step of smoothing the generated point sequence;
wherein the smoothing step includes
a step of setting filter lengths that are applied to the points such that a pre/post-smoothing divergence amount of each point in the point sequence is equal to or less than a first threshold, and that the filter lengths are set the largest,
a step of changing the set filter lengths such that an absolute value of a difference between the filter lengths applied to adjacent points in the point sequence is equal to or less than a second threshold, and
a step of performing filter processing based on the changed filter lengths.

5. A non-transitory recording medium storing a tool-path generating program that causes a computer to execute:
point-sequence generating processing that generates a point sequence that represents a tool path based on a machining program; and
smoothing processing that smooths the generated point sequence;
wherein the smoothing processing includes
processing for setting filter lengths that are applied to the points such that a pre/post-smoothing divergence amount of each point in the point sequence is equal to or less than a first threshold, and that the filter lengths are set the largest,
processing for changing the set filter lengths such that an absolute value of a difference between the filter lengths applied to adjacent points in the point sequence is equal to or less than a second threshold, and
processing for performing filter processing based on the changed filter lengths.

* * * * *